(12) United States Patent
Shikina et al.

(10) Patent No.: US 11,700,467 B2
(45) Date of Patent: Jul. 11, 2023

(54) PHOTOELECTRIC CONVERSION DEVICE, PHOTOELECTRIC CONVERSION SYSTEM, AND MOVABLE BODY

(71) Applicant: CANON KABUSHIKI KAISHA, Tokyo (JP)

(72) Inventors: Noriyuki Shikina, Tokyo (JP); Yoshiko Shigiya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/474,305

(22) Filed: Sep. 14, 2021

(65) Prior Publication Data

US 2022/0094875 A1 Mar. 24, 2022

(30) Foreign Application Priority Data

Sep. 18, 2020 (JP) .................. 2020-157865

(51) Int. Cl.
*H04N 25/71* (2023.01)
*H04N 23/60* (2023.01)
*H04N 25/75* (2023.01)

(52) U.S. Cl.
CPC ......... *H04N 25/745* (2023.01); *H04N 23/665* (2023.01); *H04N 25/75* (2023.01)

(58) Field of Classification Search
CPC .. H04N 5/3765; H04N 5/23227; H04N 5/378; H04N 5/232; H04N 5/3532; H04N 5/3575; H04N 5/37457; H04N 25/745; H04N 23/665; H04N 25/75; H04N 25/531; H04N 25/616; H04N 25/778; H04N 23/60
See application file for complete search history.

(56) References Cited

U.S. PATENT DOCUMENTS

| | | | |
|---|---|---|---|
| 8,605,169 B2 | 12/2013 | Nishide | |
| 10,389,964 B2 | 8/2019 | Taniguchi | |
| 10,645,316 B2 | 5/2020 | Shigiya | |
| 10,659,713 B2 | 5/2020 | Shikina | |
| 10,924,663 B2 | 2/2021 | Ito | |

(Continued)

FOREIGN PATENT DOCUMENTS

| | | |
|---|---|---|
| JP | 2004-140479 A | 5/2004 |
| JP | 2010-4146 A | 1/2010 |
| JP | 2020-113918 A | 7/2020 |

OTHER PUBLICATIONS

U.S. Appl. No. 17/466,068, filed Sep. 3, 2021 by Yoshiko Shigiya et al.

*Primary Examiner* — Michael E Teitelbaum
(74) *Attorney, Agent, or Firm* — Venable LLP

(57) ABSTRACT

A photoelectric conversion device of the present disclosure includes: a scanning unit; a first storage unit that stores a first setting value representing a setting of a first scan in response to an input from the outside; and a second storage unit that stores a second setting value representing a setting of a second scan in response to an input from the outside, wherein the scanning unit performs the first scan based on the first setting value and the second scan based on the second setting value in one frame period, and wherein both storing of the first setting value in the first storage unit and storing of the second setting value by the second storage unit are performed prior to a start of the first scan and a start of the second scan.

21 Claims, 9 Drawing Sheets

(56) References Cited

U.S. PATENT DOCUMENTS

| | | | |
|---|---|---|---|
| 11,019,294 B2* | 5/2021 | McMahon | H04N 5/378 |
| 2016/0073016 A1 | 3/2016 | Ohya | |
| 2020/0096640 A1* | 3/2020 | Atanassov | G06T 3/4038 |
| 2020/0142073 A1* | 5/2020 | Gassend | G01S 17/10 |
| 2020/0154067 A1 | 5/2020 | Igarashi | |
| 2021/0044766 A1 | 2/2021 | Shikina | |
| 2021/0067717 A1 | 3/2021 | Shigiya | |
| 2021/0176421 A1 | 6/2021 | Shikina | |
| 2021/0306577 A1 | 9/2021 | Shigiya | |

* cited by examiner

PHOTOELECTRIC CONVERSION DEVICE, PHOTOELECTRIC CONVERSION SYSTEM, AND MOVABLE BODY

BACKGROUND OF THE INVENTION

Field of the Invention

The present disclosure relates to a photoelectric conversion device, a photoelectric conversion system, and a movable body.

Description of the Related Art

Japanese Patent Application Laid-Open No. 2004-140479 discloses a CMOS image sensor in which a two-dimensional pixel array is scanned with a rolling shutter operation per pixel rows. Japanese Patent Application Laid-Open No. 2004-140479 also discloses, as an embodiment, an example in which a readout operation of a distance measurement signal used for AF (Auto Focus) control is performed during a blank period of a readout operation of an image. In this example, AF control can be performed during an imaging operation.

However, in a complex scanning method in which a plurality of scans are performed in one frame period as disclosed in Japanese Patent Application Laid-Open No. 2004-140479, communication of information related to setting of scans becomes complicated, and it may be difficult to sufficiently secure communication time.

SUMMARY OF THE INVENTION

Accordingly, an object of the present disclosure is to provide a photoelectric conversion device, a photoelectric conversion system, and a movable body which are enable to realize simple control in which a plurality of scans are performed in one frame period.

According to one aspect of the present disclosure, provided a photoelectric conversion device including: a plurality of pixels arranged in a plurality of rows; a scanning unit that performs a first scan and a second scan for sequentially outputting signals from the plurality of pixels for each row; a first storage unit that stores a first setting value representing a setting of the first scan in response to an input from the outside; and a second storage unit that stores a second setting value representing a setting of the second scan in response to an input from the outside, wherein the scanning unit performs the first scan based on the first setting value and the second scan based on the second setting value in one frame period, and wherein both storing of the first setting value in the first storage unit and storing of the second setting value by the second storage unit are performed prior to a start of the first scan and a start of the second scan.

Further features of the present invention will become apparent from the following description of exemplary embodiments with reference to the attached drawings.

DESCRIPTION OF THE EMBODIMENTS

Figure 1:
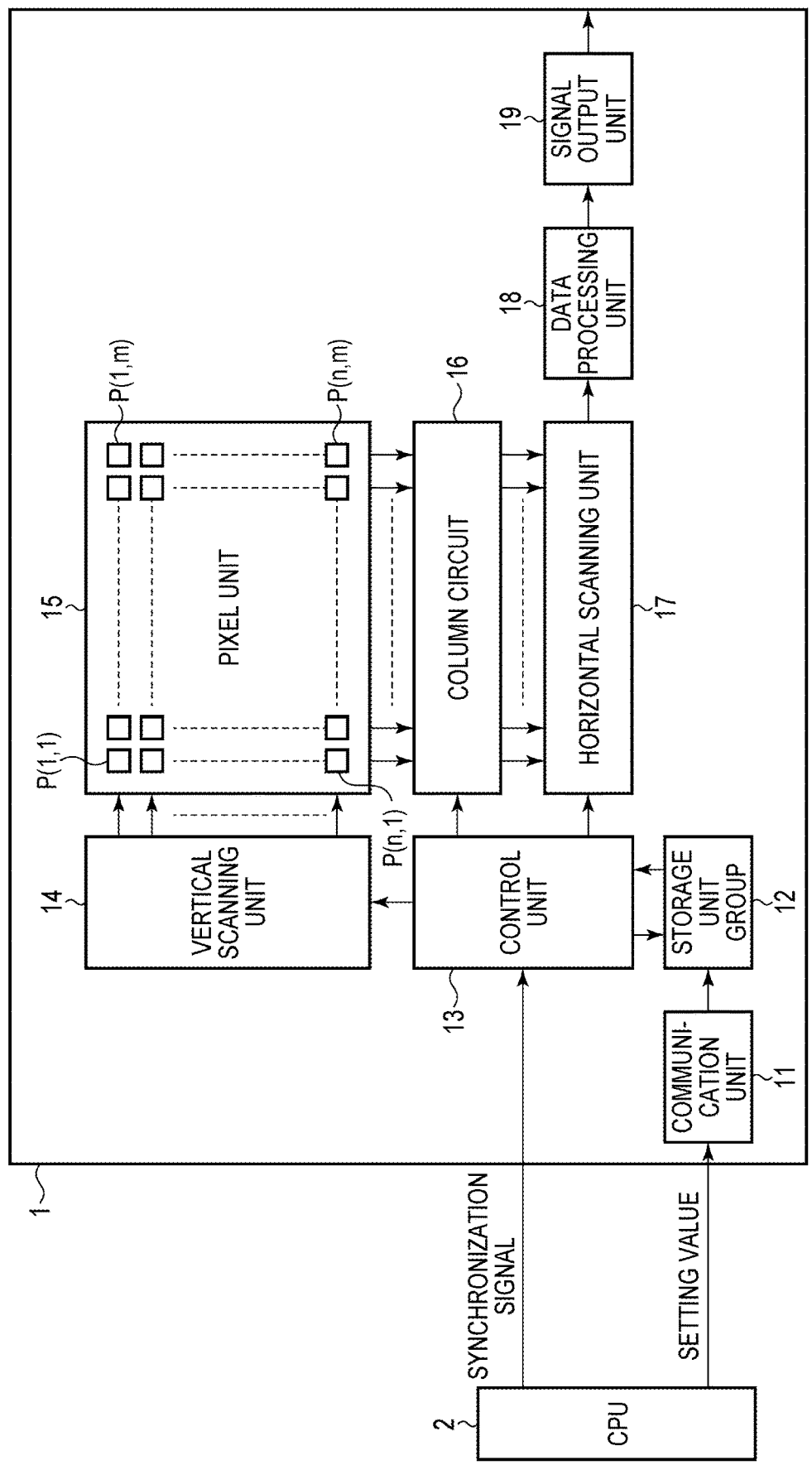
FIG. 1 is a block diagram illustrating a configuration example of a photoelectric conversion device according to a first embodiment.

Preferred embodiments of the present invention will now be described in detail in accordance with the accompanying drawings. In the drawings, the same or corresponding elements are denoted by the same reference numerals, and the description thereof may be omitted or simplified.

First Embodiment

FIG. 1 is a block diagram illustrating a configuration example of a photoelectric conversion device 1 according to the present embodiment. The photoelectric conversion device 1 includes a communication unit 11, a storage unit group 12, a control unit 13, a vertical scanning unit 14, a pixel unit 15, a column circuit 16, a horizontal scanning unit 17, a data processing unit 18, and a signal output unit 19. In the present embodiment, an example of a solid-state imaging device which is a type of photoelectric conversion device 1 to which the present disclosure can be applied will be described, but the present invention is not limited thereto. Examples of the photoelectric conversion device to which the present disclosure can be applied include a solid-state imaging device, a focus detection device, a distance measuring device, and a TOF (Time-Of-Flight) camera.

In the pixel unit 15, a plurality of pixels P arranged in a plurality of rows and a plurality of columns are arranged. FIG. 1 illustrates pixels P (1, 1) to P (n, m) arranged in two dimensions of n-rows and m-columns. Here, in the notation of the pixel P (X, Y), X represents a row number, and Y represents a column number. It is assumed that the row number of the top row is the first row, and the column number of the left end column is the first column. In this specification, when pixels P arranged at a specific position in the pixel unit 15 are shown, they are expressed together with row numbers and column numbers such as "pixel P (n, m)", and when the position in the pixel unit 15 is not specified, they are simply expressed such as "pixel P".

The vertical scanning unit 14 (scanning unit) is connected to the pixels P via control lines provided for each row. The vertical scanning unit 14 is a circuit unit that supplies a control signal for driving the readout circuit in the pixel P to the pixel P via a control line. The vertical scanning unit 14 operates in response to a signal from the control unit 13, and performs vertical scanning for sequentially outputting signals from the pixels P of the pixel unit 15. The vertical scanning may include a shutter operation and a readout operation. The shutter operation in the vertical scan refers to an operation of sequentially resetting and releasing the reset of the photoelectric conversion elements on a row-by-row basis with respect to the pixels P in a part or all of the rows of the pixel unit 15 to start exposure (accumulation of charges). The readout operation in the vertical scanning refers to an operation of sequentially outputting pixel signals based on charges accumulated in the photoelectric conversion elements on a row-by-row basis to the pixels P in some or all of the rows of the pixel unit 15.

The column circuit 16 includes an amplifier circuit, an analog-to-digital conversion (AD conversion) circuit, a memory, and the like. The column circuit 16 amplifies a pixel signal output from the pixel P via an output line arranged corresponding to each column, performs AD conversion, and stores the amplified pixel signal in a memory as a digital pixel signal.

The horizontal scanning unit 17 operates in response to a signal from the control unit 13, and outputs control signals sequentially to the memories of the respective columns of the column circuits 16. The column circuit 16 receives the control signal from the horizontal scanning unit 17, and outputs the digital pixel signal held in the memory of the corresponding column to the data processing unit 18.

The data processing unit 18 is a digital circuit that performs predetermined digital signal processing, parallel-to-serial conversion, and the like. The processed data is output to the signal output unit 19. The signal output unit 19 includes an external interface such as LVDS (Low Voltage Differential Signaling) circuit. The signal output unit 19 outputs the acquired digital pixel signal as serial data to the outside of the photoelectric conversion device 1. The data processing unit 18 is a digital circuit that performs predetermined digital signal processing, parallel-to-serial conversion, and the like. The processed data is output to the signal output unit 19. The signal output unit 19 includes an external interface such as LVDS (Low Voltage Differential Signaling) circuit. The signal output unit 19 outputs the acquired digital pixel signal as serial data to the outside of the photoelectric conversion device 1.

The control unit 13 is a circuit unit for supplying control signals for controlling operations and operation timings executed by the vertical scanning unit 14, the column circuit 16, the horizontal scanning unit 17, and the like.

A CPU (Central Processing Unit) 2 is an arithmetic processing circuit for controlling the operation of the photoelectric conversion device 1. The CPU 2 may be provided, for example, in a photoelectric conversion system in which the photoelectric conversion device 1 is mounted, that is, outside the photoelectric conversion device 1. The CPU 2 transmits a synchronization signal to the control unit 13. Further, the CPU 2 transmits a setting value indicating the setting of the scanning timing or the like to the communication unit 11. The setting values received by the communication unit 11 are stored in the storage unit group 12, and then supplied to the control unit 13.

Figure 2:
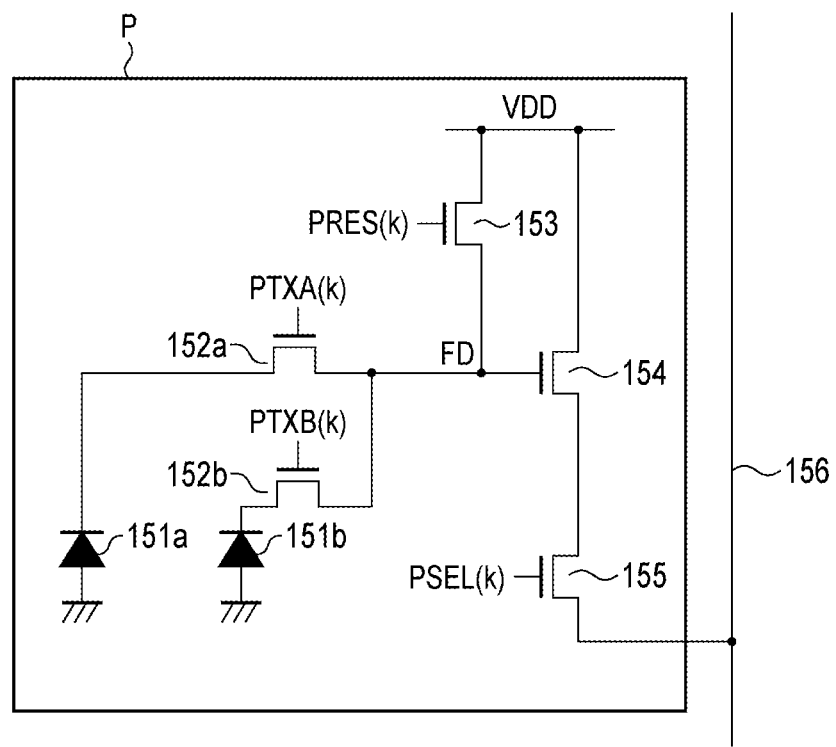
FIG. 2 is an equivalent circuit diagram illustrating a configuration example of a pixel according to the first embodiment.

FIG. 2 is an equivalent circuit diagram illustrating a configuration example of a pixel P according to the present embodiment. The pixel P includes photoelectric conversion units 151a and 151b, transfer transistors 152a and 152b, a reset transistor 153, an amplifier transistor 154, and a select transistor 155. One micro lens is provided corresponding to one pixel P. In other words, the two photoelectric conversion units 151a and 151b share one microlens. Thus, the photoelectric conversion units 151a and 151b are arranged to receive light passing through different exit pupils of the optical system. Although FIG. 2 shows one pixel P arranged in the k-th column of the plurality of pixels P as an example, the same applies to other pixels P. Note that "k" in parentheses of names of control signals shown in FIG. 2 indicates a row number. That is, k is an integer of one or more and n or less.

The photoelectric conversion units 151a and 151b are photoelectric conversion elements, for example, photodiodes. The anodes of the photodiodes constituting the photoelectric conversion units 151a and 151b are connected to a ground node. The cathodes of the photodiodes constituting the photoelectric conversion units 151a and 151b are connected to the sources of the transfer transistors 152a and 152b, respectively. The drains of the transfer transistors 152a and 152b are connected to the source of the reset transistor 153 and the gate of the amplifier transistor 154. The connection node between the drains of the transfer transistors 152a and 152b, the source of the reset transistor 153, and the gate of the amplifier transistor 154 is a so-called floating diffusion FD. The floating diffusion FD includes a capacitance component, functions as a charge holding unit, and constitutes a charge-voltage conversion portion including the capacitance component. The drain of the reset transistor 153 and the drain of the amplifier transistor 154 are connected to a power supply node (voltage VDD). The source of the amplifier transistor 154 is connected to the drain of the select transistor 155. The source of the select transistor 155 is connected to the output line 156. A current source (not shown) is connected to the output line 156. Note that a source and a drain of a transistor sometimes differ depending on a conductivity type of the transistor, a function to be specified, or the like, and the source and the drain may be referred to as opposite names.

In the circuit configuration shown in FIG. 2, the control line in each row includes two transfer gate signal lines, a reset signal line, and a selection signal line. The two transfer gate signal lines are connected to the gates of the transfer transistors 152a and 152b of the pixels P belonging to the corresponding row, and supply control signals PTXA and PTXB supplied from the vertical scanning unit 14 to the gates of the transfer transistors 152a and 152b. For example, control signals PTXA(k) and PTXB(k) are supplied to the pixels P in the k-th row via two transfer gate signal lines in the k-th row.

The reset signal line is connected to the gate of the reset transistor 153 of the pixel P belonging to the corresponding row, and supplies the control signal PRES supplied from the vertical scanning unit 14 to the gate of the reset transistor 153. For example, the control signal PRES(k) is supplied to the pixels P in the k-th row via the reset signal line in the k-th row.

The selection signal line is connected to the gate of the select transistor 155 of the pixel P belonging to the corresponding row, and supplies the control signal PSEL supplied from the vertical scanning unit 14 to the gate of the select transistor 155. For example, the control signal PSEL(k) is supplied to the pixels P in the k-th row via the selection signal line in the k-th row.

When each transistor of the pixel P is formed of an N-channel transistor, the corresponding transistor is turned on when a high-level control signal is supplied from the vertical scanning unit 14, and the corresponding transistor is turned off when a low-level control signal is supplied from the vertical scanning unit 14. Here, the high level corresponds to the logical value "1", and the low level corresponds to the logical value "0". Each transistor of the pixel P may be a P-channel transistor. When each transistor of the pixel P is formed of a P-channel transistor, a signal level of a control signal for driving each transistor is opposite to that of the N-channel transistor.

When the optical image of the subject is incident on the pixel unit 15, the photoelectric conversion units 151a and 151b of the respective pixels P convert the incident light into charges of an amount corresponding to the amount of light (photoelectric conversion), and accumulate the generated charges. When the transfer transistors 152a and 152b are turned on, charges accumulated in the photoelectric conversion units 151a and 151b are transferred to the floating diffusion FD.

The floating diffusion FD holds charges transferred from the photoelectric conversion units 151a and 151b, and converts the charges into a voltage corresponding to the amount of charges transferred from the photoelectric conversion units 151a and 151b by charge-voltage conversion based on the capacitance component thereof. The amplifier transistor 154 has a configuration in which the voltage VDD is supplied to the drain and a bias current is supplied to the source via the select transistor 155, and constitutes an amplifier section (source follower circuit) having a gate as an input node. Thus, the amplifier transistor 154 outputs a pixel signal based on the voltage of the floating diffusion FD to the output line 156 via the select transistor 155.

The reset transistor 153 is turned on to reset the floating diffusion FD to a voltage corresponding to the voltage VDD. When the reset transistor 153 and the transfer transistors 152a and 152b are turned on at the same time, the photoelectric conversion units 151a and 151b can be reset to a voltage corresponding to the voltage VDD.

Figure 3:
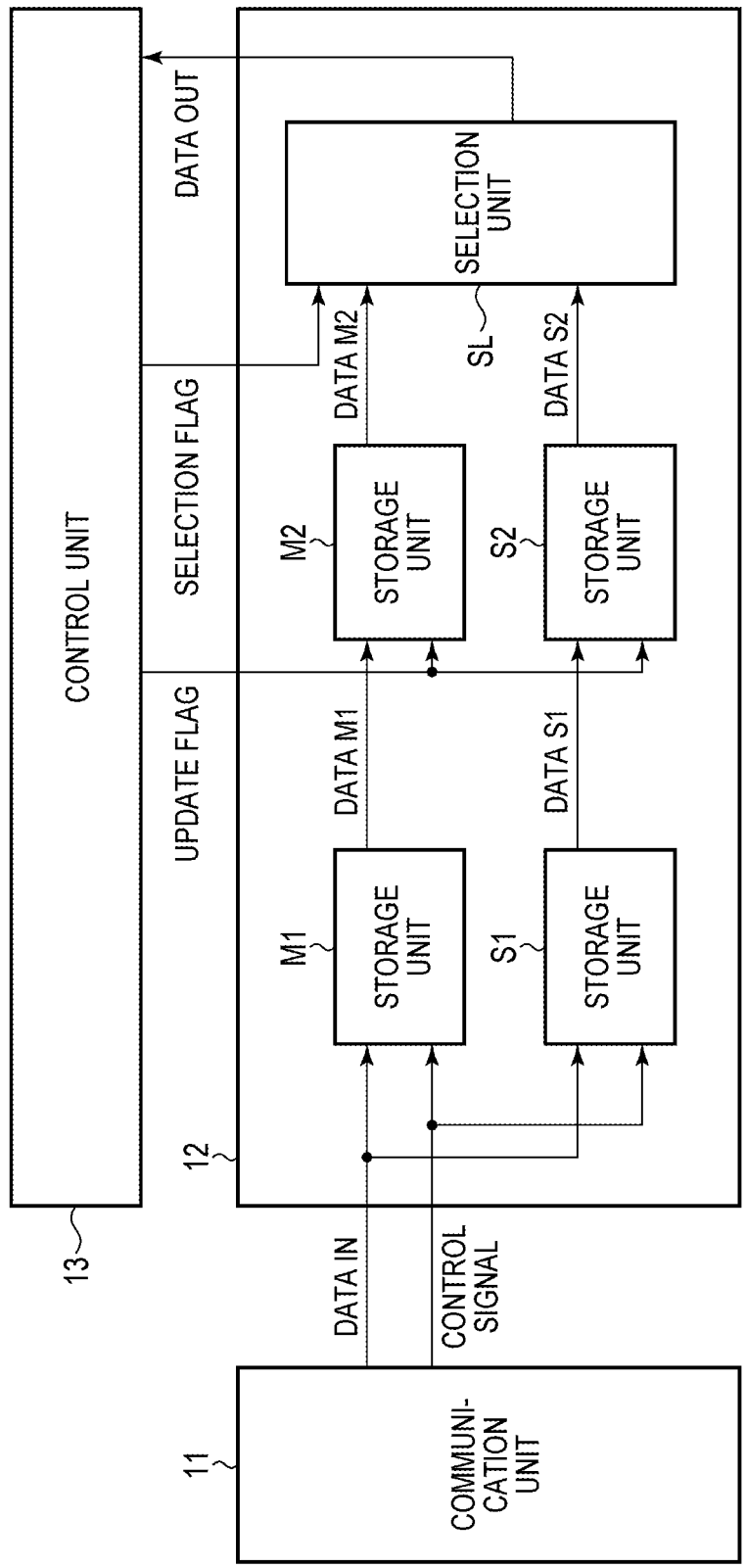
FIG. 3 is a block diagram illustrating a configuration example of a storage unit group according to the first embodiment.

FIG. 3 is a block diagram illustrating a configuration example of the storage unit group 12 according to the present embodiment. The storage unit group 12 includes a storage unit M1 (third storage unit), a storage unit M2 (first storage unit), a storage unit S1 (fourth storage unit), a storage unit S2 (second storage unit), and a selection unit SL. The storage units M1, M2, S1, and S2 are storage elements that store information including setting values related to scanning. The selection unit SL is a selection circuit that selects and outputs one of a plurality of input signals in accordance with the input selection flag.

In response to an output signal from the CPU 2, the communication unit 11 outputs a control signal for controlling data input/output in the storage units M1 and S1, and data (data IN) related to a setting value indicating a setting such as a scanning timing to the storage units M1 and S1. Each of the storage units M1 and S1 can store a setting value of another scan performed within one frame period. Here, the setting value stored in the storage unit M1 is referred to as data M1, and the setting value stored in the storage unit S1 is referred to as data S1.

The storage unit M1 outputs the data M1 to the storage unit M2, and the storage unit S1 outputs the data S1 to the storage unit S2. The storage unit M2 updates the setting value stored in the storage unit M2 by storing the data M1 input from the storage unit M1 at a timing based on the update flag input from the control unit 13. The storage unit S2 updates the setting value stored in the storage unit S2 by storing the data S1 input from the storage unit S1 at a timing based on the update flag input from the control unit 13. Here, the setting value stored in the storage unit M2 is referred to as data M2, and the setting value stored in the storage unit S2 is referred to as data S2.

The storage units M2 and S2 output the data M2 and S2 to the selection unit SL, respectively. The selection unit SL selectively activates one of the data M2 and the data S2 based on the selection flag input from the control unit 13. The selection unit SL outputs the selected data to the control unit 13 as data OUT.

Figure 4A:
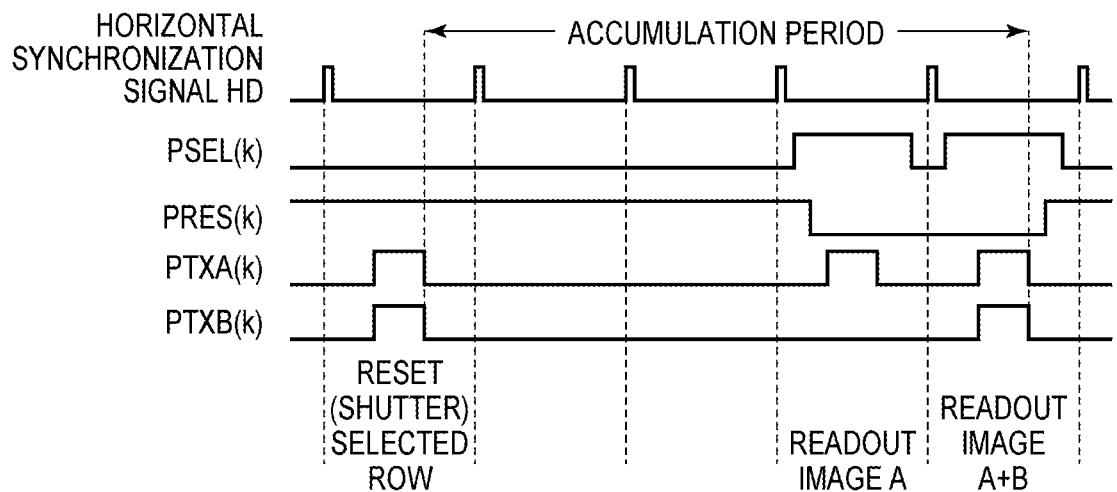
FIG. 4A and FIG. 4B are timing charts illustrating a driving method of pixels in one row according to the first embodiment.
Figure 4B:
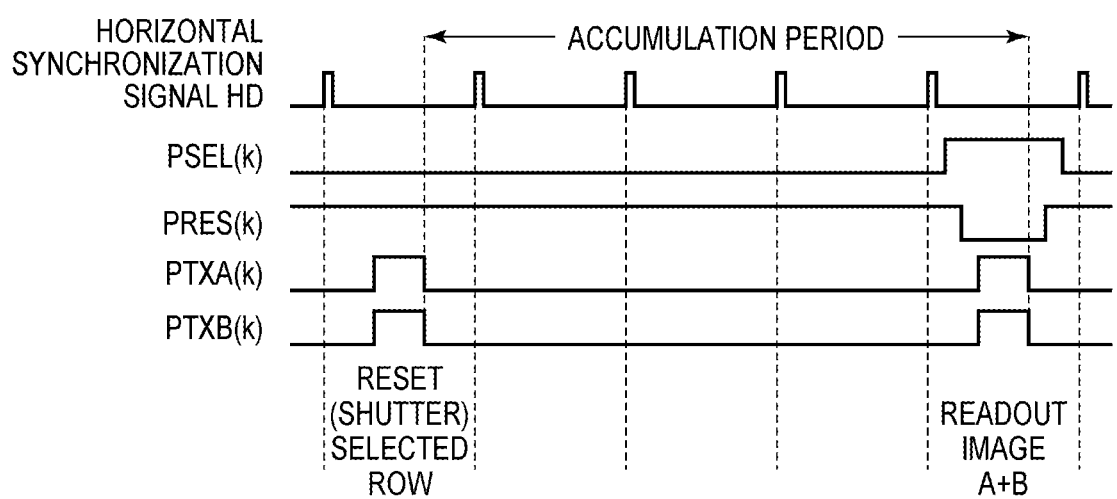

FIG. 4A is a timing chart showing an example of a driving method of the pixels P in one row according to the first embodiment. FIG. 4B is a timing chart showing another example of the driving method of the pixels P in one row according to the first embodiment. FIGS. 4A and 4B schematically illustrate a shutter operation and a readout operation in each row of the pixel unit 15. FIGS. 4A and 4B illustrate only control signals related to the pixels P in the k-th row.

To begin with, a first example of a driving method will be described with reference to FIG. 4A. This example is a driving method of continuously reading out a pixel signal (image A) based on only charges generated by one photoelectric conversion unit 151a and a pixel signal (image A+B) based on charges generated by both the photoelectric conversion unit 151a and the photoelectric conversion unit 151b.

In the shutter operation, the control signals PRES(k), PTXA(k), and PTXB(k) are controlled to a high level to simultaneously turn on the transfer transistors 152a and 152b and the reset transistor 153. Thus, the photoelectric conversion units 151a and 151b are connected to the power supply node via the transfer transistors 152a and 152b and the reset transistor 153, and the photoelectric conversion units 151a and 151b are reset to a potential corresponding to the voltage VDD. Thereafter, the timing at which the reset of the photoelectric conversion units 151a and 151b is released by controlling the control signals PTXA(k) and PTXB(k) to the low level is the start time of the charge accumulation period in the photoelectric conversion units 151a and 151b.

In the readout operation of the image A, the control signal PRES(k) is controlled to a low level, the control signals PSEL(k) and PTXA(k) are controlled to a high level, and the transfer transistor 152a and the select transistor 155 are simultaneously turned on while the reset transistor 153 is in an off-state. Thus, the charges accumulated in the photoelectric conversion unit 151a are transferred to the floating diffusion FD. The amplifier transistor 154 outputs the pixel signal of the image A corresponding to the potential of the floating diffusion FD to the output line 156 via the select transistor 155. In this manner, the image A based on the charges generated by the photoelectric conversion unit 151a is read.

Following the readout operation of the image A, the readout operation of the image A+B is performed. In the readout operation of the image A+B, the control signal PRES(k) is controlled to a low level, and the control signals PSEL(k), PTXA(k), and PTXB(k) are controlled to a high level. At this time, the transfer transistors 152a and 152b and the select transistor 155 are simultaneously turned on while the reset transistor 153 is in an off-state. Thus, the charges accumulated in the photoelectric conversion unit 151a and the charges accumulated in the photoelectric conversion unit 151b are transferred to the floating diffusion FD. The amplifier transistor 154 outputs the pixel signal of the image A+B corresponding to the potential of the floating diffusion FD to the output line 156 via the select transistor 155. Thus, the image A+B based on the charges generated by the photoelectric conversion units 151a and 151b is read.

By subtracting the pixel signal of the image A from the pixel signal of the image A+B, a pixel signal (image B) based on the charge generated by the photoelectric conversion unit 151b can be obtained. The pixel signals of the image A and the pixel signals of the image B thus obtained can be used for focusing applications such as focus detection. The result of focus detection can be used for focusing operation of the imaging system or the like. The pixel signals of the image A+B can be used to generate a picture. In this way, in this example, pixel signals for ranging and pixel signals for a picture can be acquired.

Next, a second example of the driving method will be described with reference to FIG. 4B. This example is a driving method in which only pixel signals (image A+B) based on charges generated by both the photoelectric conversion units 151a and 151b are read. In this example, the readout operation of the image A is omitted from the first example shown in FIG. 4A. Since the other points are substantially the same as those of FIG. 4B, description thereof will be omitted. In this example, although pixel signals of the image A and the image B cannot be obtained, pixel signals for a picture can be obtained by a simple driving operation.

In FIG. 4A, the pixel signals of the image B may be acquired instead of the image A+B after the pixel signals of the image A is acquired. Even in this driving method, pixel signals for ranging can be acquired. It is also possible to acquire the pixel signals of the image A+B for a picture by adding these signals after acquiring the pixel signals of the image A and the pixel signals of the image B.

Although not explicitly shown in FIG. 4A and FIG. 4B, the signal N may be read immediately after the control signal PRES(k) is set to the low level, that is, before the control signals PTXA(k) and PTXB(k) are set to the high level. The signal N is a signal corresponding to the potential of the floating diffusion after the reset is released, and indicates the level of reset noise that can be caused by the reset. The influence of reset noise can be reduced by performing correlation double sampling processing in which signal N is subtracted from pixel signal of the image A, the image B, or the image A+B.

Figure 5:
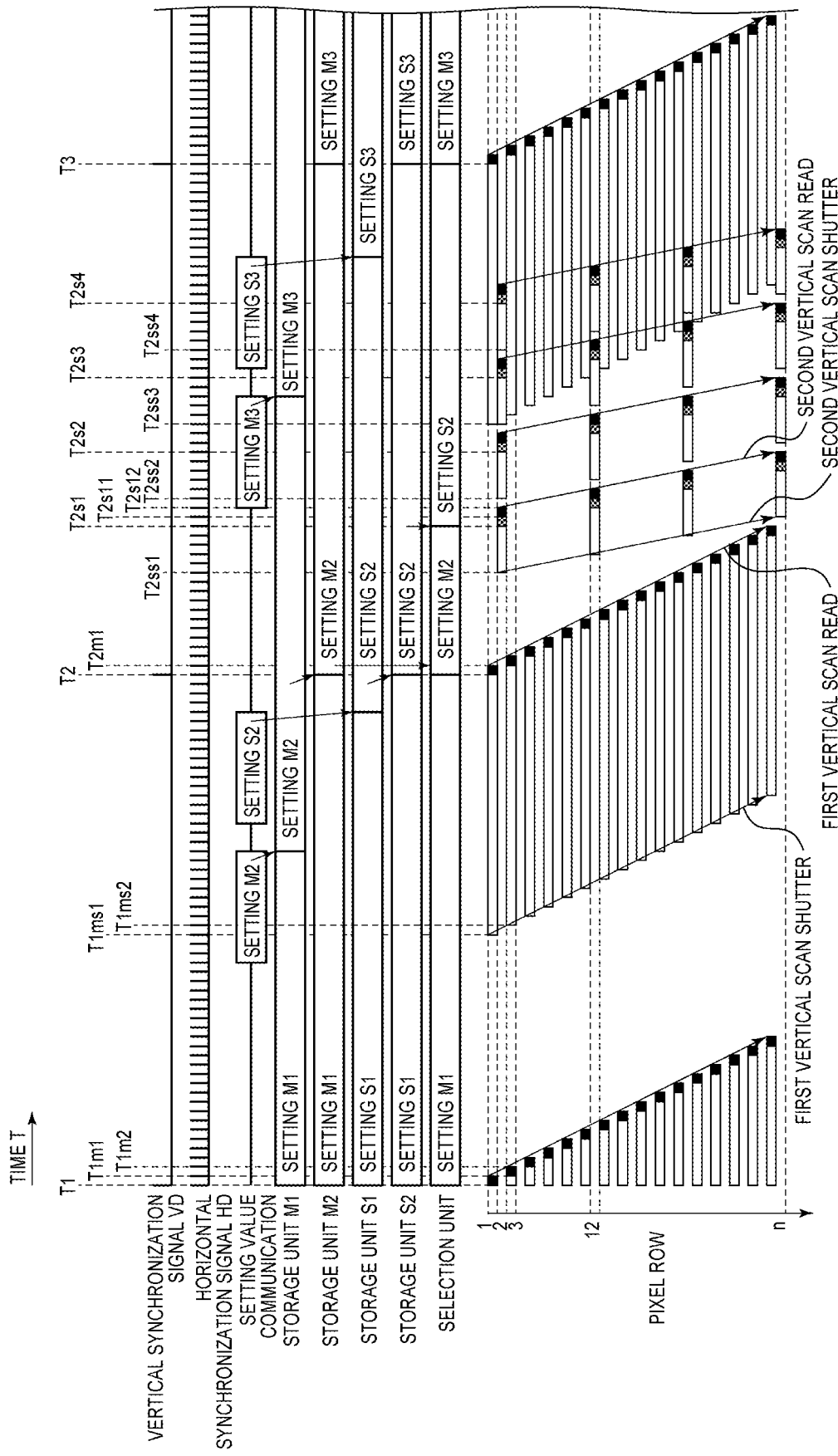
FIG. 5 is a timing chart illustrating a driving method of the pixel unit according to the first embodiment.

FIG. 5 is a timing chart illustrating a driving method of the pixel unit 15 according to the present embodiment. In this embodiment, an example will be described in which pixel signals (image A+B) for a picture is acquired from the pixel P in the (2k-1)-th row by the first vertical scan (first scan), and pixel signals (image A and image A+B) for ranging (distance measurement) are acquired from the pixel P in the (10k-8)-th row by the second vertical scan (second scan). That is, the driving method of each row in the first vertical scan is, for example, as shown in FIG. 4B, and the driving method of each row in the second vertical scan is, for example, as shown in FIG. 4A. Note that the type of vertical scanning, the number of a row to be read, the ratio of a row to be read, and the like are merely examples, and are not limited to those illustrated.

The upper part of FIG. 5 shows the timing at which the vertical synchronization signal VD and the horizontal synchronization signal HD are input. A box in the "setting value communication" in the middle part of FIG. 5 indicates a setting value input from the communication unit 11 to the storage unit group 12. Boxes in the "storage unit M1" to the "storage unit S2" in the middle of FIG. 5 indicate setting values stored in the corresponding storage unit. A box in the "selection unit" in the middle of FIG. 5 indicates a setting value output from the selection unit SL. The lower part of FIG. 5 shows the timing of the shutter operation and the readout operation in the pixels of each pixel row. Boxes in each pixel row indicate periods between shutter operations and read operations.

First, the operation of the first frame (from time T1 to time T2) shown in FIG. 5 will be described. The first frame shows an example in which only the first vertical scanning is performed and the second vertical scanning is not performed.

At the time T1, the readout operation of the first vertical scan is started in synchronization with the vertical synchronization signal VD. It is assumed that the shutter operation is performed in advance in a frame before the first frame, that is, in a period before the time T1.

During the period from the time T1 to the time T1m1, the pixel signal of the image A+B for a picture is read out from the pixel P in the first row in synchronization with the horizontal synchronization signal HD. Next, in a period from the time T1m1 to the time T1m2, the readout operation of the pixel signal of the image A+B for a picture is performed from the pixel P in the third row in synchronization with the horizontal synchronization signal HD. Thereafter, similarly, the readout operation of the pixels P in the (2k-1)-th row is sequentially performed in synchronization with the horizontal synchronization signal HD.

In the first frame, the shutter operation of the first vertical scan is started from the time T1ms1. This is for starting charge accumulation for the readout operation of the second frame. At the time T1ms1, a shutter operation for releasing the reset of the pixels P in the first row is performed in synchronization with the horizontal synchronization signal HD. Next, at the time T1ms2, a shutter operation is performed to release the reset of the pixels P in the third row in synchronization with the horizontal synchronization signal HD. Thereafter, similarly, the shutter operation of the pixels P in the (2k-1)-th row is sequentially performed in synchronization with the horizontal synchronization signal HD.

Next, the operation of the second frame (from time T2 to time T3) shown in FIG. 5 will be described. The second frame shows an example in which one time of the first vertical scan and four times of the second vertical scans are performed. Before either the first vertical scan or the second vertical scan, the storing of setting value M2 by the storage unit M2 as the first storage unit and the storing of setting value S2 by the storage unit S2 as the second storage unit are performed.

At the time T2, the readout operation of the first vertical scan is started in synchronization with the vertical synchronization signal VD. During the period from the time T2 to the time T2m1, the pixel signal of the image A+B for a picture is read out from the pixel P in the first row in synchronization with the horizontal synchronization signal HD. Thereafter, similarly, the readout operation of the pixels P in the (2k-1)-th row is sequentially performed in synchronization with the horizontal synchronization signal HD.

At the time T2ss3, the shutter operation for releasing the reset of the pixels P in the first row is started in synchronization with the horizontal synchronization signal HD. This is for starting charge accumulation for the readout operation of the third frame. At the time T2ss3, a shutter operation for releasing the reset of the pixels P in the first row is performed in synchronization with the horizontal synchronization signal HD. Thereafter, similarly, the shutter operation of the pixels P in the (2k-1)-th row is sequentially performed in synchronization with the horizontal synchronization signal HD.

As described above, in this example, the first vertical scan in the second frame is substantially the same as the first vertical scan in the first frame. However, the setting values of the first vertical scan may be different between frames.

In the second frame, four times of the second vertical scans are performed in parallel with the first vertical scan described above. From time T2$ss$1, the second vertical scan for the first time is started. At the time T2$ss$1, a shutter operation for releasing the reset of the pixels P in the second row is performed in synchronization with the horizontal synchronization signal HD. During the period from the time T2$s$1 to the time T2$s$11, the pixel signals of the image A for ranging are read out from the pixels P in the second row in synchronization with the horizontal synchronization signal HD. Thereafter, in a period from the time T2$s$11 to the time T2$s$12, in synchronization with the horizontal synchronization signal HD, a readout operation of pixel signals of the image A+B for focusing and a picture is performed from the pixels P in the second row. As described above, the pixel signals of the image B can be calculated from the pixel signals of the image A+B and the pixel signals of the image A, and the pixel signals of the image A and the pixel signals of the image B can be used for ranging.

At a time after two cycles of the horizontal synchronization signal HD from the time T2$ss$1, the shutter operation is performed on the pixels in the 12th row. Thereafter, two pixel signals are similarly read out from the pixels P in the 12th row. Thereafter, similarly, the shutter operation of the pixels P in the (10k−8)-th row and the readout operation of the two pixel signals are sequentially performed every two cycles of the horizontal synchronization signal HD.

The second vertical scan for the second time is started at the time T2$ss$2, the second vertical scan for the third time is started at the time T2$ss$3, and the second vertical scan for the fourth time is started at the time T2$ss$4. Since the operation of the second vertical scans for the second time to the fourth time are the same as those of the second vertical scan for the first time, descriptions thereof will be omitted.

Next, the operation of the third frame (from time T3) shown in FIG. 5 will be described. The third frame is an example in which only the first vertical scanning is performed and the second vertical scanning is not performed, and the description thereof is omitted because it is the same as the first frame.

Next, the operation of the storage unit group 12 relating to the setting of the readout operation in the first vertical scan and the second vertical scan will be described with reference to FIG. 5. Here, "M #" (# is a natural number) in the boxes in FIG. 5 indicates a setting value (first setting value) of the first vertical scan, and "S #" (# is a natural number) in the boxes indicates a setting value (second setting value) of the second vertical scan.

At the time T1 of the first frame, the setting value M1 is stored in the storage unit M1 and the storage unit M2, and the setting value S1 is stored in the storage unit S1 and the storage unit S2. Here, the selection unit SL selects the setting value S1 stored in the storage unit M2 and outputs the selected setting value M1 to the control unit 13. Thus, the readout operation of the first vertical scan started at the time T1 is performed based on the setting value M1.

Between the time T1 and the time 12, that is, within the period of the first frame, the CPU 2 transmits the setting value M2 of the first vertical scan in the second frame to the communication unit 11. Immediately after the communication unit 11 receives the setting value M2, the setting value M2 is stored in the storage unit M1. Thereafter, the CPU 2 transmits the setting value S2 of the second vertical scan in the second frame to the communication unit 11 within the period of the first frame. Immediately after the communication unit 11 receives the setting value S2, the setting value S2 is stored in the storage unit S1.

Thereafter, at the time T2, the setting value M2 stored in the storage unit M1 is stored in the storage unit M2, and the setting value S2 stored in the storage unit S1 is stored in the storage unit S2. At this time, the output of the selection unit SL also changes from the setting value M1 to the setting value M2. Thus, the setting value M2 is applied to the readout operation of the first vertical scan started at the time T2.

Next, at the time T2$s$1, the selection of the signal by the selection unit SL is switched, and the output of the selection unit SL changes from the setting value M2 to the setting value S2. Thus, the setting value S2 is applied to the readout operation of the second vertical scan started at the time T2$s$1.

Between the time T2 and the time T3, that is, within the period of the second frame, the CPU 2 transmits the setting value M3 of the first vertical scan in the third frame to the communication unit 11. Immediately after the communication unit 11 receives the setting value M3, the setting value M3 is stored in the storage unit M1. Thereafter, the CPU 2 transmits the setting value S3 of the second vertical scan in the third frame to the communication unit 11 within the period of the second frame. Immediately after the communication unit 11 receives the setting value S3, the setting value S3 is stored in the storage unit S1.

Thereafter, at the time T3, the setting value M3 stored in the storage unit M1 is stored in the storage unit M2, and the setting value S3 stored in the storage unit S1 is stored in the storage unit S2. Further, in this example, since only the first vertical scan is performed in the third frame, the signal selected by the selection unit SL is switched at the time T3. Therefore, the output of the selection unit SL changes from the setting value S2 to the setting value M3. Thus, the setting value M3 is applied to the readout operation of the first vertical scan started at the time T3.

In the scanning method in which the first vertical scanning and the second vertical scanning are performed in one frame period as in the present embodiment, it is necessary to switch the setting values at high speed in accordance with the scanning timing, which may complicate the scanning control. Therefore, for example, it may be difficult to ensure the communication time of the setting values. In contrast, in the present embodiment, the storage unit group 12 includes the storage unit M2 that stores the setting value of the first vertical scan and the storage unit S2 that stores the setting value of the second vertical scan. Thus, the storage unit group 12 can store both the setting values of the first vertical scan and the setting values of the second vertical scan at the same time. Accordingly, since these setting values can be communicated in advance prior to the first vertical scanning and the second vertical scanning, the control of the scanning can be simplified. As described above, according to the present embodiment, it is possible to provide the photoelectric conversion device 1, that can realize simple control in which a plurality of scans are performed in one frame period.

In the present embodiment, the storage unit group 12 further includes the storage unit M1 that temporarily stores the setting value of the first vertical scan input from the outside, and the storage unit S1 that temporarily stores the setting value of the second vertical scan input from the outside. Thus, since the timing when the setting value is reflected can be delayed from the timing of communication, a longer communication time can be secured. According to this configuration, the timing when the setting value of the first vertical scan is input to the storage unit M1 and the timing when the setting value of the second vertical scan is input to the storage unit S1 can be set before the start of the frame period to which these setting values are applied. Thus, the communication of the setting value can be completed before the start of the frame period in which the setting value is used, and the communication time can be easily secured. The timing when the setting value stored in the storage unit M1 is output to the storage unit M2 and the timing when the setting value stored in the storage unit S1 is output to the storage unit S2 are the start timing of the frame. Thus, the setting value can be enabled at the start of the frame.

In the present embodiment, the storage unit group 12 further includes the selection unit SL that selectively outputs the setting values stored in the storage unit M2 and the setting values stored in the storage unit S2. Thus, the timing at which either the setting value of the first vertical scan or the setting value of the second vertical scan is enabled and the timing at which the storage units M2 and S2 store the setting values can be shifted from each other, so that a longer communication time can be secured. Further, with this configuration, it is possible to validate either the setting value of the first vertical scan or the setting value of the second vertical scan at a timing after the start time of the frame period. Accordingly, the setting value can be changed immediately before scanning, and freedom in setting of scan operation can be improved.

Note that the above-described the setting value M # and the setting value S # may include not only setting values for vertical scanning, but also setting values related to gain setting, data correction setting, and the like. Thus, different gains can be applied between the first vertical scan and the second vertical scan, for example, the gain of the first vertical scan can be one time and the gain of the second vertical scan can be four times.

In the example of the driving method shown in FIG. 5, the pixel signals for a picture can be acquired in the first vertical scan, and the pixel signals for ranging can be acquired in the second vertical scan. For example, the pixel signals for ranging may be acquired in the first vertical scan, and the pixel signals for a picture may be acquired in the second vertical scan. Further, pixel signals for a picture may be acquired by both the first vertical scan and the second vertical scan, or pixel signals for ranging may be acquired by both the first vertical scan and the second vertical scan.

Although only the readout operation is described in the description of the set values in the driving method shown in FIG. 5, the same processing can be applied to the setting values of the shutter operation.

Second Embodiment

In the first embodiment, the same setting value is used in the four times of the second vertical scans for in the second frame. In contrast, in the present embodiment, an example in which the setting value is changed in each of the four times of the second vertical scans will be described. The description of elements common to the first embodiment may be simplified or omitted.

Figure 6:
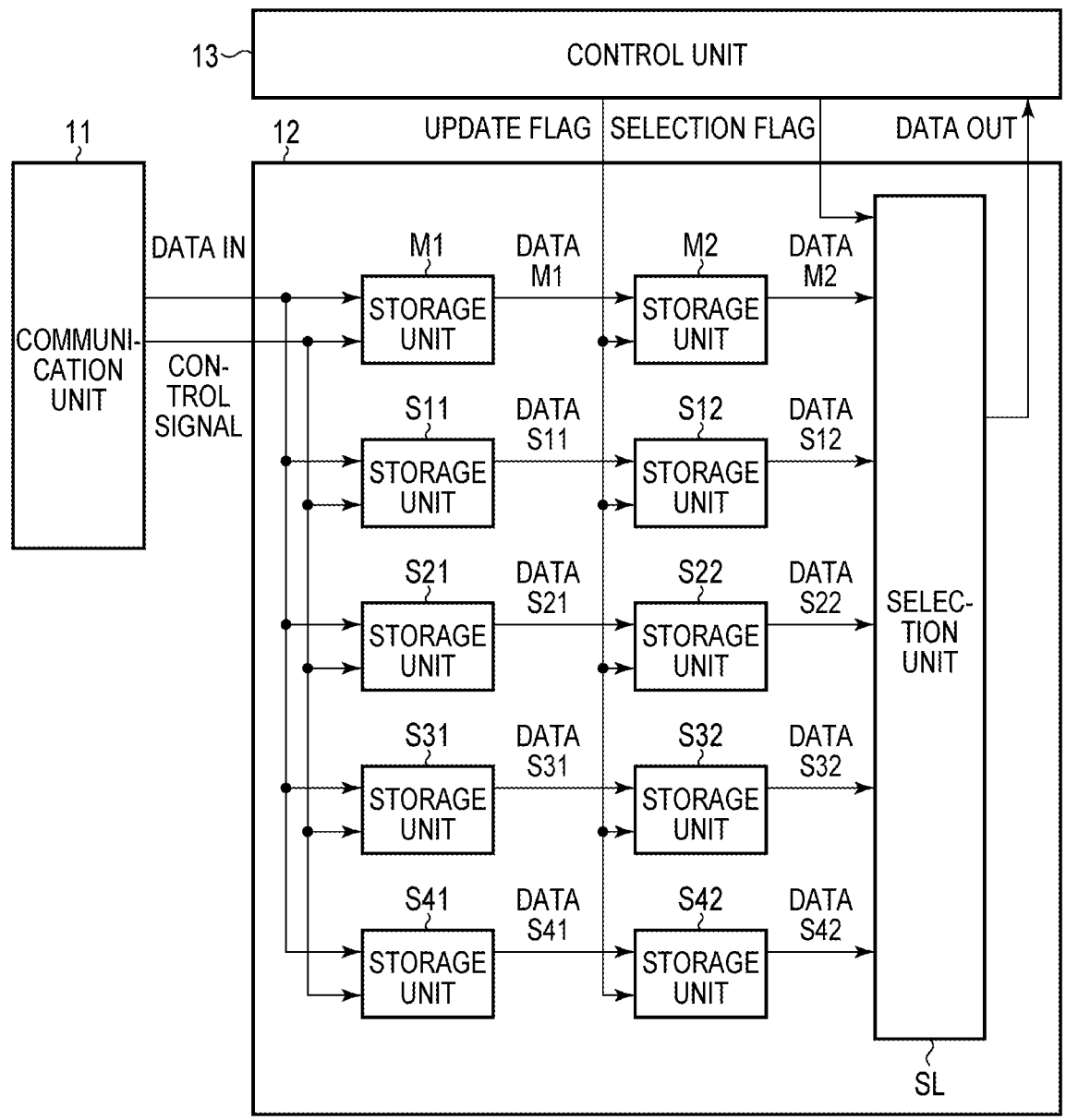
FIG. 6 is a block diagram illustrating a configuration example of a storage unit group according to a second embodiment.

FIG. 6 is a block diagram illustrating a configuration example of the storage unit group 12 according to the present embodiment. The storage unit group 12 includes storage units M1, M2, S11, S12, S21, S22, S31, S32, S41, and S42, and a selection unit SL. That is, in the present embodiment, the storage unit S1 of the first embodiment is replaced with four storage units S11, S21, S31, and S41, and the storage unit S2 of the first embodiment is replaced with four storage units S12, S22, S32, and S42.

The setting values stored in the storage units S11, S12, S21, S22, S31, S32, S41, and S42 are referred to as data S11, S12, S21, S22, S31, S32, S41, and S42, respectively. The selection unit SL selectively activates one of the data M2, S12, S22, S32, and S42 based on the selection flag input from the control unit 13. The selection unit SL outputs the selected data to the control unit 13 as data OUT.

Figure 7:
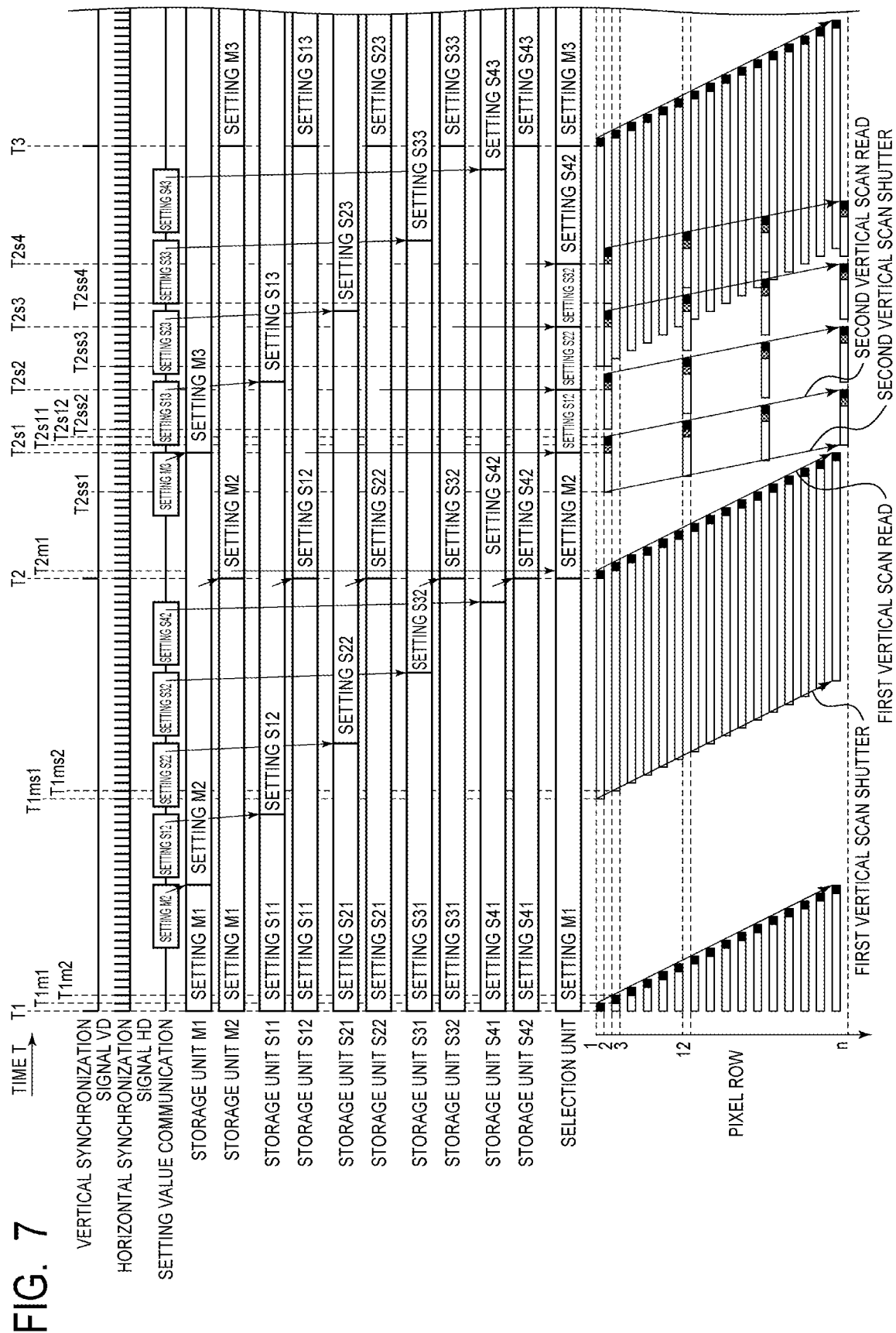
FIG. 7 is a timing chart illustrating a driving method of the pixel unit according to the second embodiment.

FIG. 7 is a timing chart illustrating a driving method of the pixel unit 15 according to the present embodiment. The second embodiment differs from the first embodiment in the operation of the storage unit group 12 related to the setting of the readout operation, and the shutter operation and the timing of the readout operation are the same as those in the first embodiment. Hereinafter, only differences from the first embodiment will be described. In FIG. 7, a "S1 #", a "S2 #", a "S3 #", and a "S4 #" in the boxes indicate setting values of the second vertical scans for the first time to the fourth time in the second frame, respectively.

At the time T1 of the first frame, the setting value M1 is stored in the storage units M1 and M2. The setting value S11 is stored in the storage units S11 and S12, and the setting value S21 is stored in the storage units S21 and S22. The setting value S31 is stored in the storage units S31 and S32, and the setting value S41 is stored in the storage units S41 and S42. Here, the selection unit SL selects the setting value M1 stored in the storage unit M2 and outputs the selected setting value M1 to the control unit 13. Thus, the readout operation of the first vertical scan started at time T1 is performed based on the setting value M1.

Between the time T1 and the time T2, that is, within the period of the first frame, the CPU 2 transmits the setting value M2 of the first vertical scan in the second frame to the communication unit 11. Immediately after the communication unit 11 receives the setting value M2, the setting value M2 is stored in the storage unit M1. Thereafter, the CPU 2 transmits the setting value S12 of the second vertical scan for the first time in the second frame to the communication unit 11 within the period of the first frame. Immediately after the communication unit 11 receives the setting value S12, the setting value S12 is stored in the storage unit S11. Thereafter, similarly, the CPU 2 sequentially transmits the setting values S22, S32, and S42 of the second vertical scans for the second time to the fourth time to the communication unit 11. The setting values S22, S32, and S42 are stored in the storage units S21, S31, and S41, respectively.

Thereafter, at the time T2, the setting value M2 stored in the storage unit M1 is stored in the storage unit M2. The setting values S12, S22, S32, and S42 stored in the storage units S11, S21, S31, and S41 are stored in the storage units S12, S22, S32, and S42, respectively. At this time, the output of the selection unit SL also changes from the setting value M1 to the setting value M2. Thus, the setting value M2 is applied to the readout operation of the first vertical scan started at the time T2.

Next, at the time T2$s$1, the selection of the signal by the selection unit SL is switched, and the output of the selection unit SL changes from the setting value M2 to the setting value S12. Thus, the setting value S12 is applied to the readout operation of the second vertical scan for the second time started at the time T2$s$1.

Next, at the time T2$s$2, the selection of the signal by the selection unit SL is switched, and the output of the selection unit SL changes from the setting value S12 to the setting value S22. Thus, the setting value S22 is applied to the readout operation of the second vertical scan for the second time started at the time T2$s$2.

Thereafter, the selection of the signal by the selection unit SL is similarly switched at the time T2$s$3 and the time T2$s$4, and the setting value S32 and the setting value S42 are applied to the readout operations of the second vertical scans for the third time and the fourth time. In this way, in the second vertical scans for the first time to the fourth time, the selection unit SL sequentially activates the setting value S12 to the setting value S42. Thus, different setting values are applied in the four times of the second vertical scans.

Between the time T2 and the time T3, that is, within the period of the second frame, the CPU 2 transmits the setting value M3 of the first vertical scan in the third frame to the communication unit 11. Immediately after the communication unit 11 receives the setting value M3, the setting value M3 is stored in the storage unit M1. Thereafter, the CPU 2 transmits the setting value S13 of the second vertical scan for the first time in the third frame to the communication unit 11 during the period of the second frame. Immediately after the communication unit 11 receives the setting value S13, the setting value S13 is stored in the storage unit S11. Thereafter, in the same manner, the CPU 2 sequentially transmits the setting values S23, S33, and S43 of the second vertical scans for the second time to the fourth time to the communication unit 11. The setting values S23, S33, and S43 are stored in the storage units S21, S31, and S41, respectively.

Thereafter, at the time T3, the setting value M3 stored in the storage unit M1 is stored in the storage unit M2. The setting values S13, S23, S33, and S43 stored in the storage units S11, S21, S31 and S41 are stored in the storage units S12, S22, S32, and S42, respectively. Further, in this example, since only the first vertical scan is performed in the third frame, the signal selected by the selection unit SL is switched at the time T3. Therefore, the output of the selection unit SL changes from the setting value S42 to the setting value M3. Thus, the setting value M3 is applied to the readout operation of the first vertical scan started at the time T3.

In the present embodiment, the storage unit group 12 has four sets of storage units for storing setting values of the second vertical scan. Thus, different setting values can be set in each of four times of the second vertical scan, and the degree of freedom in setting the second vertical scan can be improved.

Note that the number of storage units for storing the setting values of the second vertical scan is not limited to four. The number of storage units can be appropriately changed according to the design, and can be set according to, for example, the maximum number of the second vertical scans per one frame period. For example, when the maximum number of the second vertical scans is N times (N is an integer equal to or greater than 2), different set values can be applied to each second vertical scan by providing N sets of storage units for storing the set values of the second vertical scan. Specifically, by replacing the storage units S11, S21, S31, and S41 in FIG. 6 with N storage units (N fourth storage units), and replacing the storage units S12, S22, S32, and S42 with N storage units (N second storage units), the second vertical scan based on the N set values is realized.

The above-described setting values M #, S1 #, S2 #, S3 #, and S4 # may include setting values related to gain setting, data correction setting, and the like, as well as setting values related to vertical scanning, as in the first embodiment. Thus, different gains can be applied among the plurality of second vertical scans, for example, the gain of the second vertical scan for the first time can be set as one time and the gain of the second vertical scan for the second time can be set as two times.

Third Embodiment

Figure 8:
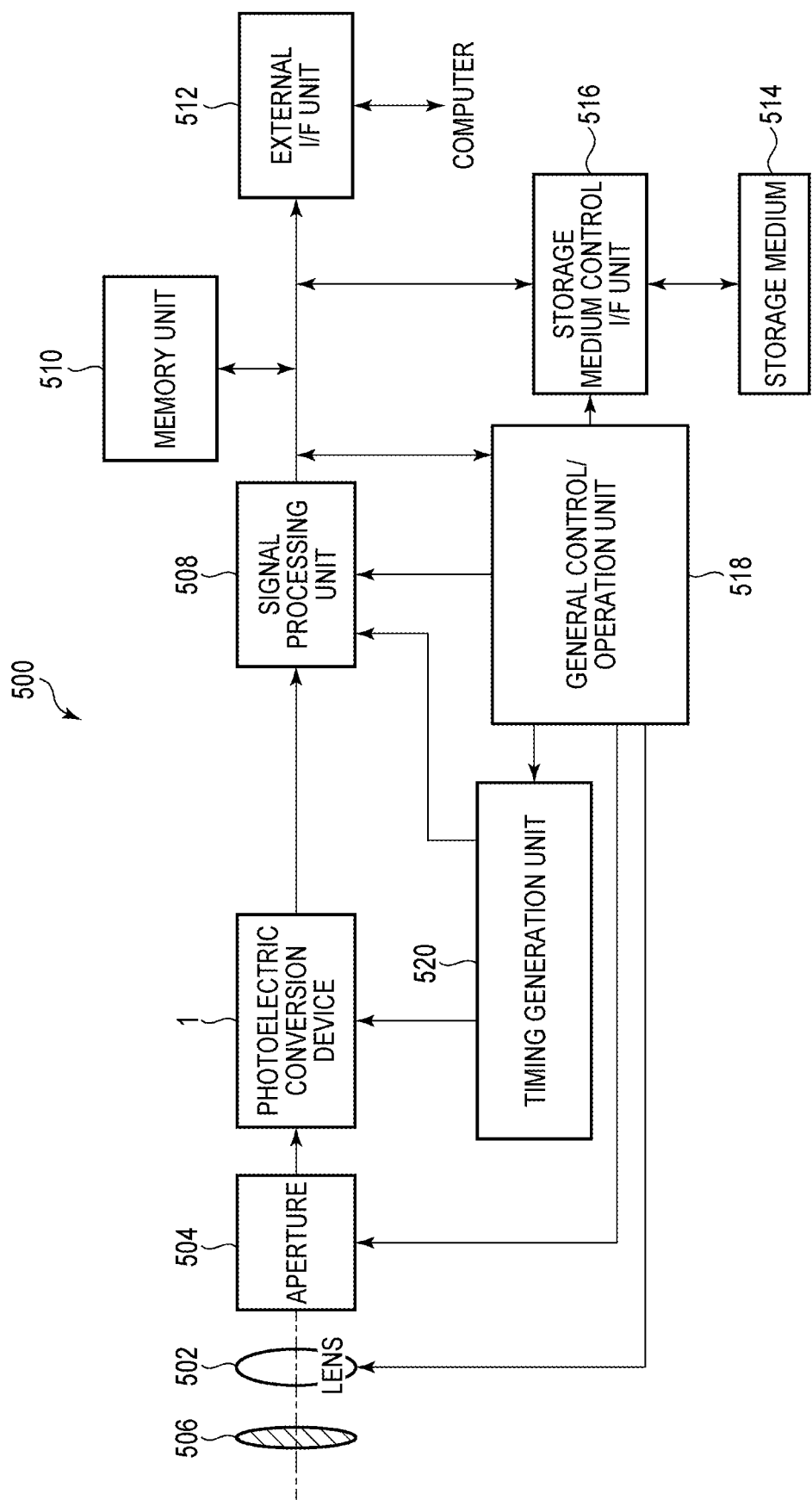
FIG. 8 is a block diagram illustrating a schematic configuration of an imaging system according to a third embodiment.

An imaging system according to a third embodiment of the present disclosure will be described with reference to FIG. 8. FIG. 8 is a block diagram illustrating a schematic configuration of an imaging system according to the present embodiment. The photoelectric conversion device 1 shown in FIG. 8 is the photoelectric conversion device 1 described in the first or second embodiment. That is, the imaging system 500 according to the present embodiment is an example of a photoelectric conversion system to which the photoelectric conversion device 1 described in the first or second embodiment can be applied.

The imaging system 500 according to the present embodiment is not particularly limited, but can be applied to, for example, a digital still camera, a digital camcorder, a camera head, a copier, a fax machine, a cellular phone, an on-vehicle camera, and an observation satellite.

As shown in FIG. 8, the imaging system 500 includes a photoelectric conversion device 1, a lens 502, an aperture 504, a barrier 506, a signal processing unit 508, a timing generation unit 520, and a general control/operation unit 518. The imaging system 500 also includes a memory unit 510, a storage medium control I/F unit 516, and an external I/F unit 512.

The lens 502 captures an optical image of a subject on the pixel unit 15 of the photoelectric conversion device 1. The aperture 504 changes the amount of light that has passed through the lens 502. The barrier 506 protects the lens 502. The photoelectric conversion device 1 is described in the above embodiments, and outputs a signal based on the optical image captured by the lens 502 to the signal processing unit 508. The signal output from the photoelectric conversion device 1 may include a signal A, a signal A+B, a signal B, and the like read out from the pixel P.

The signal processing unit 508 performs desired processing, correction, data compression, and the like on the signal output from the photoelectric conversion device 1. The processing performed by the signal processing unit 508 may include generation of corrected image data, processing of acquiring distance information to the subject based on the signal A and the signal B, and the like. The signal processing unit 508 may be formed on the same substrate as the photoelectric conversion device 1 or may be formed on a different substrate. Alternatively, some functions of the signal processing unit 508 may be formed on the same substrate as the photoelectric conversion device 1, and other functions of the signal processing unit 508 may be formed on another substrate.

The timing generation unit 520 outputs various timing signals to the photoelectric conversion device 1 and the signal processing unit 508. The general control/operation unit 518 controls overall driving and arithmetic processing of the imaging system 500. The CPU 2 in the first or the second embodiment may correspond to one or both the general control/operation unit 518 and the timing generation unit 520. Here, a control signal such as a timing signal may be input from the outside of the imaging system 500, and the imaging system 500 may include at least the photoelectric conversion device 1 and a signal processing unit 508 that processes a signal output from the photoelectric conversion device 1.

The memory unit 510 is a frame memory for temporarily storing image data. The storage medium control I/F unit 516 is an interface for performing recording on the storage medium 514 or reading from the storage medium 514. The external I/F unit 512 is an interface for communicating with an external computer or the like. The storage medium 514 is a removable recording medium such as a semiconductor memory for recording or reading imaging data.

Thus, by configuring the imaging system 500 to which the photoelectric conversion device 1 according to the first or second embodiment is applied, it is possible to realize the imaging system 500 that can realize simple control.

Fourth Embodiment

Figure 9A:
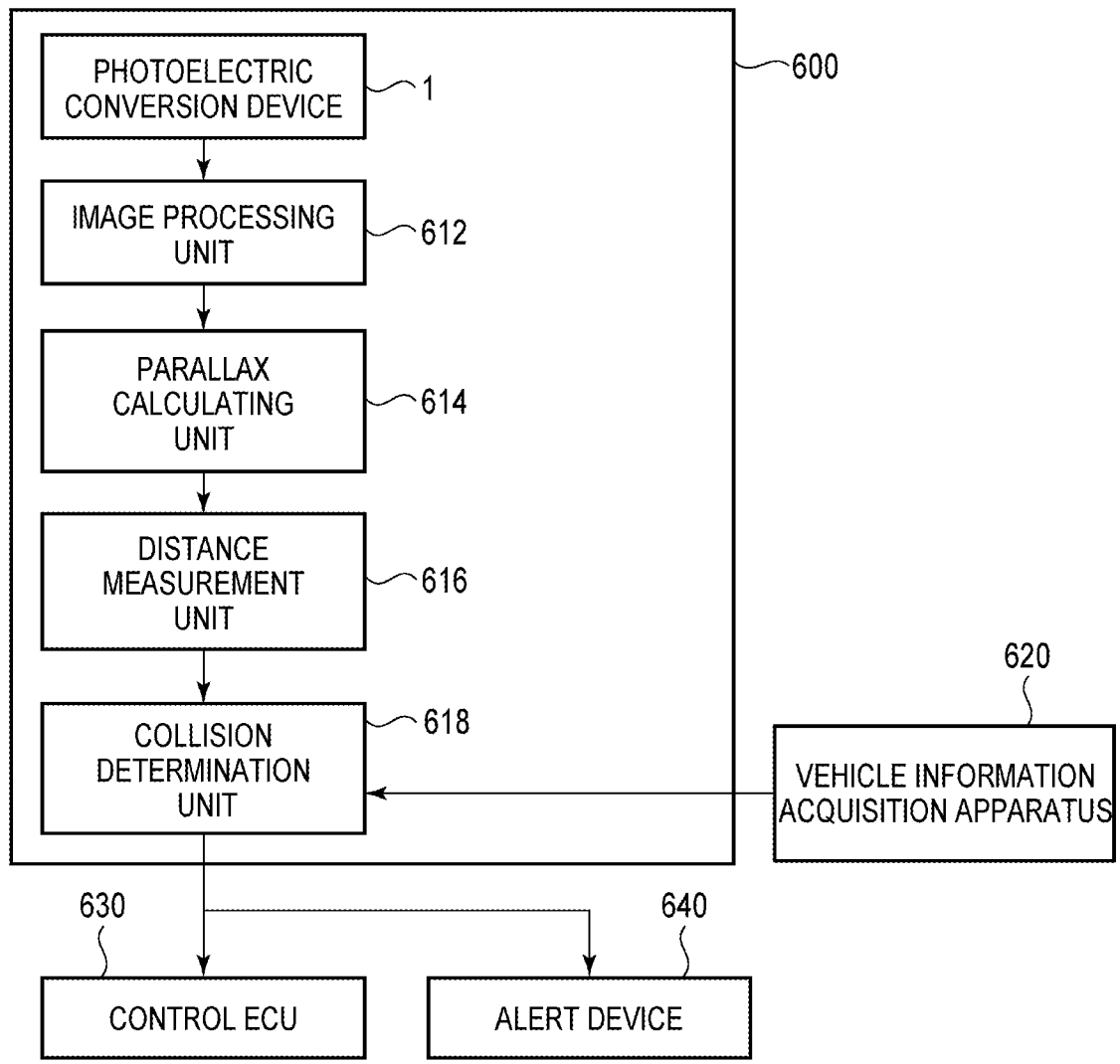
FIG. 9A and FIG. 9B are diagrams illustrating a configuration example of an imaging system and a movable body according to a fourth embodiment.
Figure 9B:
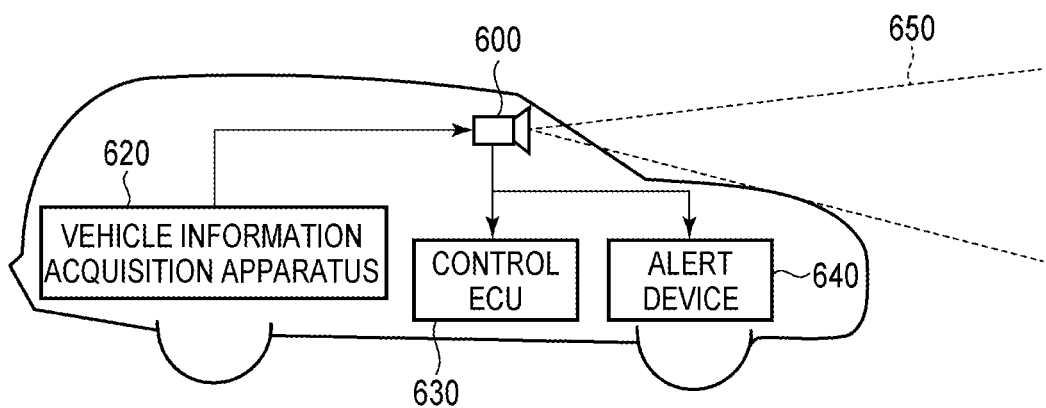

FIG. 9A and FIG. 9B are diagrams illustrating configurations of an imaging system 600 and a movable body according to the present embodiment. FIG. 9A illustrates an example of an imaging system 600 related to an on-vehicle camera. The imaging system 600 includes the photoelectric conversion device 1 according to any one of the first and second embodiments. The imaging system 600 includes an image processing unit 612 that performs image processing on a plurality of image data acquired by the photoelectric conversion device 1, and a parallax calculating unit 614 that calculates a parallax (a phase difference of parallax images) from the plurality of image data acquired by the imaging system 600. Further, the imaging system 600 includes a distance measurement unit 616 that calculates a distance to the object based on the calculated parallax, and a collision determination unit 618 that determines whether there is a possibility of collision based on the calculated distance. Here, the parallax calculating unit 614 and the distance measurement unit 616 are an example of a distance information acquiring unit that acquires distance information to an object. That is, the distance information is information related to parallax, defocus amount, distance to an object, and the like. The collision determination unit 618 may determine the possibility of collision using any of the distance information. The distance information acquisition means may be realized by hardware designed exclusively, or may be realized by a software module. It may be realized by FPGA (Field Programmable Gate Array), ASIC (Application Specific Integrated Circuit) or the like, or may be realized by a combination of these.

The imaging system 600 is connected to the vehicle information acquisition apparatus 620, and can acquire vehicle information such as a vehicle speed, a yaw rate, and a steering angle. Further, the imaging system 600 is connected to a control ECU 630, which is a control device that outputs a control signal for generating braking force to the vehicle based on the determination result of the collision determination unit 618. That is, the control ECU 630 is an example of moving object control means for controlling the moving object based on the distance information. The imaging system 600 is also connected to an alert device 640 that issues an alert to the driver based on the determination result of the collision determination unit 618. For example, when the possibility of collision is high as the determination result of the collision determination unit 618, the control ECU 630 performs vehicle control for avoiding collision and reducing damage by applying a brake, returning an accelerator, suppressing engine output, or the like. The alert device 640 sounds an alert such as a sound, displays alert information on a screen of a car navigation system or the like, applies vibration to a seatbelt or a steering wheel, or the like, and issues a warning to the user.

In this embodiment, the imaging system 600 captures an image of the periphery of the vehicle, for example, the front or the rear. FIG. 9B shows a configuration of an imaging system 600 when capturing an image of the front of the vehicle (image capturing area 650). The vehicle information acquisition apparatus 620 sends an instruction to operate the imaging system 600 to execute imaging.

Thus, by configuring the imaging system 600 and the movable body to which the photoelectric conversion device 1 according to the first or second embodiment is applied, it is possible to realize the movable body that can realize a simple control.

In the above description, an example in which control is performed so as not to collide with another vehicle has been described, but the present invention is also applicable to control in which automatic driving is performed following another vehicle, control in which automatic driving is performed so as not to protrude from a lane, and the like. Further, the imaging system can be applied not only to a vehicle such as a subject vehicle, but also to a moving object (movable device) such as a ship, an aircraft, or an industrial robot. In addition, the present invention can be applied not only to a moving object but also to an apparatus using object recognition in a wide range such as an intelligent transportation system (ITS).

Modified Embodiments

The present invention is not limited to the above-described embodiments, and various modifications are possible. For example, it is to be understood that an embodiment in which a part of the configuration of any of the embodiments is added to another embodiment or an embodiment in which a part of the configuration of any of the other embodiments is substituted is also an embodiment to which the present invention can be applied.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-157865, filed Sep. 18, 2020, which is hereby incorporated by reference herein in its entirety.

What is claimed is:

1. A photoelectric conversion device comprising:
a plurality of pixels arranged in a plurality of rows;
a scanning unit that performs a first scan and a second scan for sequentially outputting signals from the plurality of pixels for each row;
a first storage unit that stores a first setting value representing a setting of the first scan in response to an input from the outside;
a second storage unit that stores a second setting value representing a setting of the second scan in response to an input from the outside; and
a third storage unit,
wherein the scanning unit performs the first scan based on the first setting value and the second scan based on the second setting value in one frame period,
wherein both storing of the first setting value in the first storage unit and storing of the second setting value by the second storage unit are performed prior to a start of the first scan and a start of the second scan, and
wherein the third storage unit stores the first setting value input from the outside and outputs the first setting value to the first storage unit.

2. The photoelectric conversion device according to claim 1, further comprising a fourth storage unit,
wherein the fourth storage unit stores the second setting value input from the outside and outputs the second setting value to the second storage unit.

3. The photoelectric conversion device according to claim 2, wherein a timing when the first setting value is input to the third storage unit is before a timing when the one frame period starts.

4. The photoelectric conversion device according to claim 2, wherein a timing when the second setting value is input to the fourth storage unit is before a timing when the one frame period starts.

5. The photoelectric conversion device according to claim 2, wherein a timing when the first setting value is output from the third storage unit to the first storage unit is a timing when the one frame period starts.

6. The photoelectric conversion device according to claim 2, wherein a timing when the second setting value is output from the fourth storage unit to the second storage unit is a timing when the one frame period starts.

7. The photoelectric conversion device according to claim 1, further comprising a selection unit that selectively enables one of the first setting value stored in the first storage unit and the second setting value stored in the second storage unit.

8. The photoelectric conversion device according to claim 7, wherein a timing when the selection unit enables the second setting value is later than a timing when the one frame period starts.

9. A photoelectric conversion device comprising:
a plurality of pixels arranged in a plurality of rows;
a scanning unit that performs a first scan and a second scan for sequentially outputting signals from the plurality of pixels for each row;
a first storage unit that stores a first setting value representing a setting of the first scan in response to an input from the outside; and
a second storage unit that stores a second setting value representing a setting of the second scan in response to an input from the outside,
wherein the scanning unit performs the first scan based on the first setting value and the second scan based on the second setting value in one frame period,
wherein both storing of the first setting value in the first storage unit and storing of the second setting value by the second storage unit are performed prior to a start of the first scan and a start of the second scan, and
wherein the scanning unit performs N (N is an integer of two or more) times of the second scans in one frame period.

10. The photoelectric conversion device according to claim 9, further comprising N number of the second storage units that store N number of the second setting values representing N times of the second scans.

11. The photoelectric conversion device according to claim 10, further comprising N number of fourth storage units provided corresponding to N number of the second storage units,
wherein each of N number of the fourth storage units stores the second setting value input from the outside and outputs the second setting value to the corresponding second storage unit.

12. The photoelectric conversion device according to claim 10, further comprising a selection unit that selectively enables one of the first setting value stored in the first storage unit and N number of the second setting values stored in N number of the second storage units respectively.

13. The photoelectric conversion device according to claim 12, wherein the selection unit sequentially enables the N number of the second setting values in response to the N times of the second scans.

14. A photoelectric conversion system comprising:
the photoelectric conversion device according to claim 1; and
a signal processing unit that processes a signal output from the photoelectric conversion device.

15. A movable body comprising:
the photoelectric conversion device according to claim 1; and
a distance information acquiring unit that acquires distance information to an object from a parallax image based on a signal from the photoelectric conversion device; and
a control unit that controls the movable body based on the distance information.

16. The photoelectric conversion device according to claim 1, wherein in a period in which a signal is output from a pixel of a first row of the plurality of rows by the first scan, a signal is output from a pixel of a second row different from the first row of the plurality of rows by the second scan.

17. The photoelectric conversion device according to claim 9, wherein in a period in which a signal is output from a pixel of a first row of the plurality of rows by the first scan, a signal is output from a pixel of a second row different from the first row of the plurality of rows by the second scan.

18. The photoelectric conversion device according to claim 1, wherein in a length of a period from a start to an end of the first scan is different from a length of a period from a start to an end of the second scan.

19. The photoelectric conversion device according to claim 9, wherein in a length of a period from a start to an end of the first scan is different from a length of a period from a start to an end of the second scan.

20. The photoelectric conversion device according to claim 16, wherein in a length of a period from a start to an end of the first scan is different from a length of a period from a start to an end of the second scan.

21. The photoelectric conversion device according to claim 17, wherein in a length of a period from a start to an end of the first scan is different from a length of a period from a start to an end of the second scan.

\* \* \* \* \*